Figure 1:
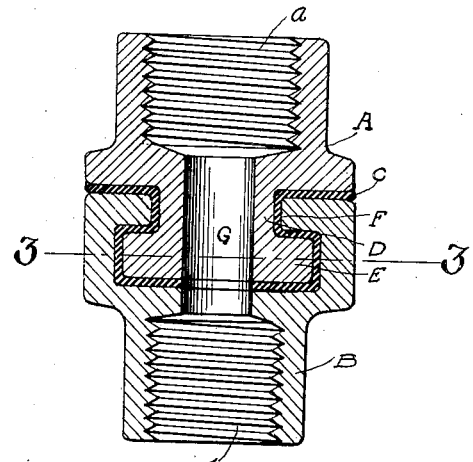

H. J. LAMPERT.
INSULATING JOINT AND PROCESS OF MAKING THE SAME.
APPLICATION FILED JAN. 26, 1911.

1,110,947.

Patented Sept. 15, 1914.

Witnesses
Robert S. McCreadie
Edgar F. Beaubien

Inventor
Henry J. Lampert
by Edward F. Wilson
Attorney.

UNITED STATES PATENT OFFICE.

HENRY J. LAMPERT, OF CHICAGO, ILLINOIS.

INSULATING-JOINT AND PROCESS OF MAKING THE SAME.

1,110,947.  Specification of Letters Patent.  Patented Sept. 15, 1914.

Application filed January 26, 1911. Serial No. 604,822.

*To all whom it may concern:*

Be it known that I, HENRY J. LAMPERT, a citizen of the United States, and a resident of Chicago, in the county of Cook and State of Illinois, have invented certain new and useful Improvements in Insulating-Joints and Process of Making the Same; and I hereby declare the following to be a full, clear, and exact description of the invention, such as will enable others skilled in the art to which it appertains to make and use the same.

My invention relates to improvements in electric insulators, and has particular reference to insulating joints for electric light fixtures and to strain insulators for insertion in guy lines.

The object of my invention is to perfect, simplify and cheapen the manufacture of such devices to the end that the insulators themselves may be made lighter, more permanent in their insulation qualities and less expensive.

A further object is to provide an insulating joint which will be amply strong to withstand any legitimate strain to which it may be subjected in use and yet be of minimum size and weight.

My invention consists in a novel manner of permanently securing one metallic part or member upon or to another part or member by casting it thereon in a molten state and allowing it to harden and shrink in place, the contacting surface of the first member having been first covered with a suitable insulating substance.

My invention consists further in an insulating joint having one member provided with an enlarged or flanged head covered with a suitable insulating material, and a second member cast on the head of the first member so that the insulating material completely separates the two parts, the second member being interlocked with the first member to prevent the separation of the two parts.

My invention further consists in an insulating joint formed of two metallic parts one cast upon the other and interlocked, and the two parts being electrically separated or insulated from each other by means of a suitable insulating substance which is interposed between the adjacent surfaces of the two parts and which serves to prevent the flow of electricity from one to the other, one of said parts being contracted upon the other and forming a gas tight joint between the contacting surfaces of the two parts.

The qualities desired in an insulating joint, are that it shall be as small as consistent with the work it is called upon to do, or the strains to which it is subjected, and that it shall effectually, electrically insulate one end from the other, and in joints for combination gas and electric fixtures, that it shall also effectually prevent the escape of gas between the joining or contacting surfaces of the two members or ends. Joints made in accordance with my improved process and embodying my invention presrve all of the above desirable qualities.

My invention will be more readily understood by reference to the accompanying drawings, forming a part of this specification and in which I have illustrated various forms of insulators made in accordance with and embodying my invention and have sufficiently portrayed the process of manufacture to enable one skilled in the art of casting metal to practice the same.

Figure 2:
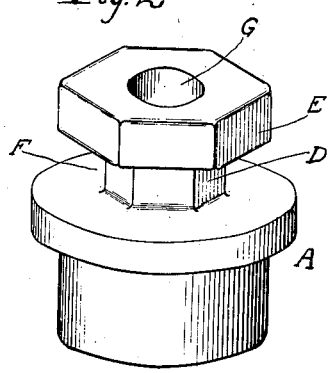
Figure 3:
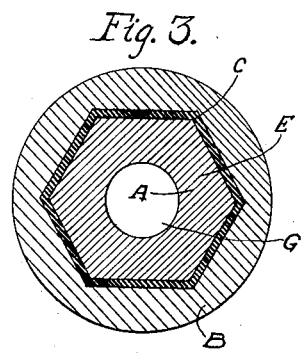
Figure 4:
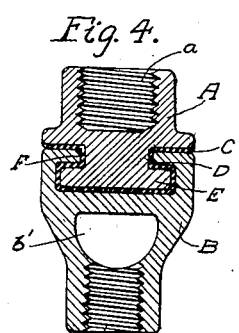
Figure 5:
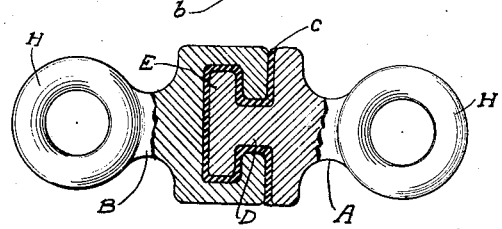

In said drawings; Figure 1 is a central longitudinal section of an insulating joint embodying my invention and illustrating an insulating joint suitable for a combination gas and electric light fixture; Fig. 2 is a perspective view of one part or end of the joint illustrated in Fig. 1; Fig. 3 is a horizontal section on the line 3—3 of Fig. 1; Fig. 4 is a view similar to Fig. 1 but illustrating an insulating joint particularly adapted for use on an electric light fixture or electrolier; and Fig. 5 is a central longitudinal section of a strain insulator embodying my invention.

My improved insulating joint, as illustrated in the drawings, consists of two parts, ends or members A and B mechanically and rigidly joined together by casting one member upon the other. These members are so formed that they are interlocked with each other in such a manner that they are permanently and immovably secured together, they are also separated by a suitable pointing substance C which not only preferably permanently unites or joins the contiguous or adjoining surfaces of the two parts, but also electrically insulates one part from the other. I form the two members to interlock in such a manner that they will sustain any legitimate strain, in use, which would tend to pull them apart longitudinally and to this end I preferably provide a central polygonal projection or pillar D upon one end of the member A and provide an enlarged head or flange E upon the outer end of this pillar. This formation provides a recess or groove F in which the member B can be formed to interlock with the member A. Preferably the member A is formed or cast of so called malleable iron and while the member B may be cast of the same metal, it is sometimes preferably formed or cast of brass or some similar bendable metal having a lower melting point and higher coefficient of expansion than the malleable iron of which the member A is made.

In my novel process of manufacturing insulators the end or member A is first formed or cast and the end or surface which is designed to be in contact with the member B, in the completed article, is then prepared for the formation of the member B by being covered with a suitable insulating material. The insulating substance C may be applied in any convenient manner but is preferably applied in the form of a paste or a semi liquid upon the surface of the member A, and preferably consists of an enamel-like insulating material and is preferably adapted to be permanently secured to the surface of the member A by being heated to a high enough temperature to be fused and which can be heated to a higher temperature than the melting point of the metal of which the member B is to be formed without injury. This insulating substance having been placed upon the member A the member A is heated to a temperature higher than the melting point of the metal of which the member B is made and the insulating substance is thereby fused and permanently cemented to and upon the surface of the member A. The member A having been thus prepared with a coating of insulating substance fused upon its surface, as described, it is placed in a mold wherein it acts as a core upon which the member B is to be cast. Having prepared the mold with the member A therein the member B is cast in place on the member A as upon a core and its contraction as it cools causes it to shrink upon the flange E and form a permanent and gas tight joint between the inner surface of the member B and the outer surface of the insulating substance C.

The outer contacting surface of the insulating material is more or less uneven and rough and consequently even if the pillar D and flange E were substantially circular in cross-section the roughness or unevenness of the contact surfaces in combination with the great pressure with which the outer member is contracted upon the inner member, or the flange E, would prevent relative rotation of the two parts. But in order to insure the retention of the outer member against rotation upon the inner member, even under the strain to which joints of this character are subjected when being installed, I preferably, as illustrated in the drawings, form the pillar D and head E of such a shape that when the member B is cast thereon, the two members are mechanically prevented from relative rotation one on the other. I have illustrated these parts as being hexagonal in form but it is obvious that they might be circular with projecting ribs or that they might be of some polygonal form other than hexagonal and fulfil the desired function, of preventing relative rotation of the two parts. The edges of the pillar D and flange E are preferably smoothed or rounded in order that the insulating substance C will stay in place better until it has been hardened by heating as described.

As clearly shown in the drawings the member B is formed or cast into the recess F and completely surrounds the projection or pillar D and the collar or flange E, and is mechanically joined to the member A through the medium of the insulation C.

The outer ends, $a$ and $b$ of the members A and B are formed suitably for the purpose for which the joint is to be used. In Fig. 1, I have illustrated both of these ends as being internally threaded and the joint is provided with a central gas passage or opening G. The joint thus formed is suitable for connecting or hanging a combination gas and electric light fixture, the joint being screwed upon the supply pipe at the end $a$ and the fixture being threaded or screwed into the end $b$. In Fig. 4, I have illustrated the end $b$ of the member B as being provided with lateral openings, $b'$ and the joint as not being provided with a central passage. This joint is particularly adapted for the hanging of an electrolier or an electric light fixture which is not provided with gas burners, the openings $b'$ being for the passage of the wires to the interior of the fixture. In hanging chandeliers, it is seldom that the stem or drop to which the fixture is fastened is exactly plumb or vertical so that it is necessary frequently to adjust the fixture, after it has been hung to bring it to a vertical position. My improved insulating joint is especially adapted to permit this adjustment of the fixture on account of the member B being made of bendable metal. The member B will bend sufficient to permit of any ordinary adjustment of the fixture without any detrimental effects either to the joint or to the fixture.

In Fig. 5 I have illustrated still another application of my invention, this being what is known as a strain insulator. In this form, the formation of the connecting or interlocked ends of the two members A and B are substantially the same as that shown in Figs. 1 and 2. The outer ends of these members are, however, modified to form eyes H so that the insulating joint may be used as an insulator in a guy wire.

My novel insulation joint includes the idea of making the two parts of the insulator of the same metal or of different metals as may be best to meet the conditions under which the joint is to be used.

As many modifications of my invention will readily suggest themselves to one skilled in the art, I do not limit or confine my invention to the specific structures herein shown and described.

Having thus described my invention, I claim as new and desire to secure by Letters Patent:

1. An insulating joint for electric fixtures comprising a member of relatively high melting point, a heat-resisting insulating material applied to the member, and a second member of relatively low melting point cast on to and interlocked with the first member.

2. An insulating joint for electric fixtures comprising a member of relatively high melting point, a vitreous heat-resisting and insulating material applied thereto, and a second member of relatively low melting point cast upon and interlocked with the first member and inclosing the insulating material.

3. An insulating joint for electric fixtures comprising a member of relatively high melting point and provided with a head, an insulating material applied to the head, and a second member of relatively low melting point cast upon and interlocked with the head.

4. An insulating joint for electric fixtures comprising two members cast together and interlocked, one of which members has a relatively high melting point and the other a relatively low melting point, the metal of relatively high melting point being provided with a head and the metal of relatively low melting point being provided with a socket to inclose the head, and a heat-resisting insulating material interposed between the union at the head and socket.

5. An insulating joint for electric fixtures composed of a metal having a relatively high melting point and provided with a polygonal head, a heat-resisting insulating material applied to the head, and a second member having a relatively low melting point cast upon the head and interlocked therewith.

6. An insulating joint for electric fixtures comprising a member of relatively high melting point and provided with a polygonal head, a vitreous insulating material applied to the head, a second member of relatively low melting point cast upon and interlocked with the head, there being a continuous passage-way through the structure as a whole.

7. The method of making insulating joints, which consists in casting a member of a metal having a relatively high melting point and provided with a head, applying to and about the head a heat-resisting insulating material, and then casting upon the head a second member of a metal having a relatively low melting point, the two parts being interlocked.

8. An insulating joint comprising a pre-formed metallic member carrying insulating material, and a metallic member secured thereto by casting to interlock therewith, said insulating material acting as a mold wall during the casting operation.

9. An insulating joint comprising a pre-formed metallic member carrying insulating material, and a metallic member cast thereon to form an embracing member with respect thereto, said pre-formed member and its insulating material acting as a mold wall in the casting operation.

10. An insulating joint comprising a pre-formed metallic member having a head, said head carrying insulating material adapted to act as a mold wall, and a metallic member cast about said head with said head and material acting as a mold wall in the casting operation.

11. The method of making insulating joints which consists in forming an insulating surface on a pre-formed joint member, and then casting the opposing member with the insulating surface forming a mold wall during the casting operation.

In testimony whereof I have signed my name in the presence of two subscribing witnesses.

HENRY J. LAMPERT.

Witnesses:
 EDWARD F. WILSON.
 PAULINE LAMPERT.